United States Patent
Kovacic et al.

(10) Patent No.: US 8,345,929 B2
(45) Date of Patent: Jan. 1, 2013

(54) METHOD FOR VISUALIZING AND COMPARING IMAGES OR VOLUMES OF DATA OF PHYSICAL QUANTITIES

(75) Inventors: Luciano Kovacic, Vizzolo Predabissi (IT); Vittorio De Tomasi, Milan (IT)

(73) Assignee: ENI S.p.A., Rome (IT)

( * ) Notice: Subject to any disclaimer, the term of this patent is extended or adjusted under 35 U.S.C. 154(b) by 1051 days.

(21) Appl. No.: 12/293,695

(22) PCT Filed: Mar. 9, 2007

(86) PCT No.: PCT/EP2007/002122
§ 371 (c)(1),
(2), (4) Date: Oct. 16, 2008

(87) PCT Pub. No.: WO2007/107257
PCT Pub. Date: Sep. 27, 2007

(65) Prior Publication Data
US 2011/0044540 A1     Feb. 24, 2011

(30) Foreign Application Priority Data
Mar. 21, 2006  (IT) .............................. MI2006A0505

(51) Int. Cl.
*G06K 9/00* (2006.01)
*G06K 9/68* (2006.01)

(52) U.S. Cl. ......... 382/109; 382/167; 382/218; 382/219

(58) Field of Classification Search .................. 382/109, 382/167, 218–219
See application file for complete search history.

(56) References Cited

U.S. PATENT DOCUMENTS

| 4,279,026 A | 7/1981 | Lambright et al. |
| 4,467,461 A | 8/1984 | Rice |
| 2004/0204859 A1 | 10/2004 | Knobloch |

*Primary Examiner* — Bhavesh Mehta
*Assistant Examiner* — Utpal Shah
(74) *Attorney, Agent, or Firm* — Oblon, Spivak, McClelland, Maier & Neustadt, L.L.P.

(57) ABSTRACT

Method for visualizing and comparing two images or volumes of data of physical quantities or information referable to the same, recorded by means of suitable equipment, comprising the following steps: —defining which of the two quantities will be represented as color variations, and which as brightness variations; —defining a chromatic representation system based on three color coordinates, in which one coordinate represents the brightness and the other two coordinates represent appropriate color attributes; —applying a suitable transformation to the values of the physical quantities to be represented, so that the values of the physical quantities to be visualized are transformed from the original coordinates into the preselected chromatic coordinates; —transforming the values of the quantities to be visualized from the system of pre-selected coordinates into the chromatic coordinates typical of the pre-selected visualization system; —visualizing the image/volume containing the combination of the two quantities.

5 Claims, No Drawings

METHOD FOR VISUALIZING AND COMPARING IMAGES OR VOLUMES OF DATA OF PHYSICAL QUANTITIES

The present invention relates to a method for visualizing and comparing images or volumes of data of physical quantities or information referable to the same, recorded by means of suitable equipment.

The method can be applied for representing several types of quantities: in particular it can be successfully applied for studying the movement of fluids in a hydrocarbon deposit by means of the technology called "4D", which includes the acquisition and processing of two or more seismic surveys recorded at a distance of a few years from each other.

The first seismic survey is called "base", whereas the subsequent surveys are called "monitor".

The movement of fluids in the deposit causes a change in the acoustic impedance of the deposit; if the conditions are favourable, the variation can be identified by comparing the acoustic impedances estimated from the various seismic surveys.

In principle, it is therefore possible to optimise the exploitation of hydrocarbon deposits using the 4D technique, by identifying, for example, the non-produced areas, the permeability barriers, etc.

The 4D technology however cannot be easily applied, as numerous factors limit its efficacy: noise, repeatability of the surveys, mechanical characteristics of the reservoir rocks, etc.

Furthermore, even if the acquisition conditions of the 4D surveys are favourable, the joint interpretation of the 4D data is not easy, as the interpreter has to deal with a multiple amount of data with respect to that typical of a 3D seismic survey: in addition to the initial surveys, in fact, the subsequent monitor surveys and/or their differences with respect to the base survey, must be examined simultaneously.

Visualization of seismic data is currently made by means of two representation techniques: the "wiggle" presentation, wherein the magnitude of the seismic signal is represented as a graph, and the "raster" presentation, wherein the seismic signal magnitude is represented as a shade of grey or a colour (R. Sheriff: Encyclopaedic Dictionary of Applied Geophysics, SEG, ISBN 1-56080-118-2). The two representation methods can be combined, so as to simultaneously represent two seismic signals, or a seismic signal and a quantity associated with it (velocity, impedance, etc.).

As previously mentioned, the 4D method requires the simultaneous visualization of the acoustic impedances of the base and monitor surveys, as the interpreter must be in a condition to evaluate both the initial impedances, and their variation with time. So far, the method used for the visualization of 4D data has been based on the simultaneous representation of the impedance data; it was observed however that the interpretation was not easy, as the useful human vision range has a limited angular opening, and comparing two noisy images one close to each other, is not always easy. The two data could be visualized simultaneously by means of a wiggle/raster combined representation, but tests proved that the resulting image is practically useless.

With the aim of easing the interpretation of 4D data, a new method has been found with the production of innovative visualization equipment.

The instrument is based on the original idea of simultaneously visualizing the data of the base survey together with the data of the monitor survey, combining them in a single image. The interpreter's task is thus facilitated as the amount of data to be simultaneously visualized is reduced, and also because the simultaneous vision of the base and monitor surveys allows a rapid identification of particulars which would have been difficult to identify by examining the two surveys separately.

The same technique can also be applied, after suitable adaptation, outside the 4D seismic field, when the difference between seismic surveys must be examined, in order to evaluate, for example, the difference between two seismic elaboration sequences, the difference between "near" and "far" traces in AVO analysis, etc., or, more generally, whenever it is necessary to examine the difference between two generic physical or geophysical quantities.

The visualization and comparison method dedicated to the representation of 4 D acoustic impedance images, must have various basic requisites:

it must give a graphic representation which is coherent with the standards normally used for the visualization of acoustic impedance: it is normal practice, in fact, to identify low impedance areas by means of a colour (normally red) and high impedance areas by means of a contrasting colour (normally blue);

it must allow the visualization of the two surveys in a single image, so as to allow the simultaneous observation of the initial impedance and its variation with time.

A study of the functioning of the human vision has allowed a visualization technique having the prescribed requisites, to be found. The human apparatus of visual perception, does, in fact, have, among other things, these characteristics (W. K. Pratt: Digital Image Processing, J. Wiley & sons, New York 1991, ISBN 0-471-85766-1; M. Delbrück: Mind from Matter? An Essay on Evolutionary Epistemology, Blackwell Scientific Publications, Palo Alto, 1986):

there are two types of photoreceptors: cones (sensitive to colours) and rods (sensitive to brightness). There are three different types of cones, whose sensitivity is maximum for different colours the response of the human sight system to variations in brightness, is such that, assigning brightness $I=0$ to black and $I=1$ to white, brightness variations of the type $\Delta I/I=$constant, are uniformly perceived when the brightness I is approximately included in the range [0.25-0.75]: outside this range the response of the system becomes strongly non-linear.

The method proposed exploits the idea of encoding the percentage variations in acoustic impedance as brightness variations (maintaining the colour hue and saturation constant) and the impedance values of the base survey as variations in colour hue and saturation (maintaining the brightness constant). This is made possible by using a suitable system of chromatic coordinates, which are then transformed into the chromatic coordinates (normally RGB) used by the graphic visualization systems.

The method, object of the present invention, for visualizing and comparing two images or volumes of data of physical quantities or information referable to the same, recorded by means of suitable equipment, comprises the following steps:

defining which of the two quantities will be represented as colour variation, and which as brightness variation;

defining a system for chromatic representation based on three colour coordinates, in which one coordinate represents the brightness and the other two coordinates represent appropriate colour attributes;

applying a suitable transformation to the values of the physical quantities to be represented, so that the values of the physical quantities to be visualized are transformed from the original coordinates into the preselected chromatic coordinates;

transforming the values of the quantities to be visualized from the system of pre-selected coordinates into the chromatic coordinates typical of the pre-selected visualization system;

visualizing the image/volume containing the combination of the two quantities.

The transformation in general includes linear and non-linear operations, also aimed at improving the representation of the quantities (filtering, threshold application, etc.), compensating the intrinsic limits of the technology used for the representation of the image, and compensating the limits of the human sight apparatus.

The codification method also allows the operators of the image processing normally used, such as limit thresholds, gamma correction, denoising, etc. to be applied separately to the two image components (difference and base impedance). In this way it is possible to emphasize at will the details of the seismic data under examination.

The results obtained by applying the visualization technique described herein to a real case, show that the simultaneous codification of 4D surveys in a single image, allows the user to easily identify the interesting regions of the survey, as areas having different properties appear with different colour shades: it is therefore quite simple to identify the areas which require a deep analysis, from those which are associated with false signals (caused by noise, lithological effects, etc.). Furthermore, the grouping of the two surveys into a single image allows the immersion of the image into environments of virtual reality, thus improving the understanding of the seismic data.

This visualization and comparison method can be profitably adopted for the simultaneous visualization of other data of interest for seismic exploration. For example:

amplitude and phase of a seismic signal

"near offset" and "far offset" amplitudes of an AVO survey comparison between two seismic signals subjected to different elaborations.

It can be affirmed that, in general, the visualization method according to the invention can be used for the visualization and comparison of any physical quantity, in particular a geophysical quantity.

The economical advantages expected from the use of this technology are mainly linked to a reduction in the work time needed for the qualitative analysis of time lapse seismic data (TLS). This can be quantified as a 50% reduction in the times necessary for the interpretation of TLS data and relative supporting results (seismic attribute maps).

In addition to the undoubted economical advantages, this technology allows the interpreter a better interpretation of TLS data: it seems reasonable to assume that the application of the technology also to other seismic data (AVO maps, amplitude/phase attributes, etc.) can produce analogous benefits.

An embodiment example, in which further technical details are described for the detailed description of the technology, is provided for a better illustration of the present invention.

EXAMPLE

The transformation of two 3D seismic images forming a 4D survey in a single image is made in the following way.

Let us assume that $B=B(x,y,z)$ and $M=M(x,y,z)$ are the acoustic impedances of the 3D base and monitor surveys which form the 4D survey.

For the representation of the colours of an image, we will adopt a system of chromatic coordinates which allows brightness to be separated from the colour shade, such as, for example, the system called $YC_BC_R$ (ITU-601). As image visualization systems (computer monitor, printers, etc.) normally use RGB chromatic coordinates, the transformation $$Y = 0.299\,R + 0.587\,G + 0.114\,B$$

$$C_B = -0.168736\,R - 0.331264\,G + 0.5\,B + 0.5 \quad (1)$$

$$C_R = 0.5\,R - 0.418688\,G - 0.081312\,B + 0.5$$

allows the coordinates $YC_BC_R$ to be associated with each other, and the RGB coordinates normally used for the visualization on a graphic peripheral unit.

Transformations similar to (1) also exist for other coordinate systems, the choice of the $YC_BC_R$ system is therefore not compulsory.

The two 3D base and monitor surveys are combined with each other to obtain the percentage difference:

$$D = D(x, y, z) = \frac{M(x, y, z) - B(x, y, z)}{B(x, y, z)} \quad (2)$$

$[D_m\ D_M]$ being the range which includes all the values assumed by D. The variation range is typically included between $-0.1/0.1$.

D represents the percentage variation in the impedance between one survey and the other of 4D: bearing in mind the characteristics of the human sight system previously described, it is evident that if D is codified as brightness of an image and if the range $[D_m\ D_M]$ is associated with the brightness range wherein the eye reaction is uniform, the variations in the acoustic impedance of 4D will be correctly perceived by the user. Assigning the value of zero to the absence of brightness (black) and the value of 1 to the maximum brightness (white), the optimum codification is obtained by transforming the range $[D_m\ D_M]$ into the range $[0.25\ 0.75]$.

This is easily obtained by establishing:

$$Y = 0.5((D - D_{min})/(D_{max} - D_{min})) + 0.25 \quad (3)$$

(The limits 0.25 and 0.75 can be possibly adapted so as better adapt the transformation to possible diversities of the sight apparatus of the user).

It may be convenient to process the D and/or Y values by introducing, for example, thresholds on the minimum and maximum values assumed by D, or applying a "gamma correction" operator (Pratt, [2]) to the Y values found, of the type:

$$Y(\gamma) = Y^\gamma \quad (4)$$

so as to enhance/mitigate various characteristics of the 4D survey. Furthermore, (non) linear filters can be applied, if necessary, to the Y values in order to attenuate the noise, etc.

The image created so far, contains a black and white representation of the acoustic impedance variations of the 4D survey: we must now superimpose the image of the base survey, without modifying the image brightness. The use of the chromatic coordinates YIQ allows the above to be easily obtained: it is in fact sufficient to encode the information of the impedance of the base survey in the coordinates $C_B$, $C_R$, without modifying the Y value. The function which associates $B(x,y,z)$ with the $C_B$ and $C_R$ values must be selected so as to respect the representation standard of the acoustic impedance normally used. This can be easily accomplished by means of a couple of functions of the type:

$$C_B = f(B)$$

$$C_R = g(B)$$

In our case, we have selected (but other solutions are obviously possible):

$$C_B=(B-B_{min})/(B_{max}-B_{min})$$

$$C_R=1-C_b$$

wherein $B_{min}$ and $B_{max}$ are the minimum and maximum value assumed by $B(x,y,z)$, respectively. Also in this case, it is obviously useful to apply operators of pre/post image processing, as for the previous case.

At this point, an image is obtained codified in $YC_RC_B$ which, once transformed in the RGB space, can be visualized on a graphic peripheral unit of the traditional type (monitor, printer, etc.).

The invention claimed is:

1. A method for simultaneously visualizing and comparing two images or volumes of data of physical quantities or information referable to the physical quantities, comprising the following steps:
   defining a first physical quantity to be represented as a color variation, and a second physical quantity to be represented as a brightness variation, wherein the first physical quantity is to be compared with the second physical quantity by visualizing;
   defining a system for chromatic representation based on three color coordinates, in which a first color coordinate represents brightness and a second color coordinate and a third color coordinate represent color attributes;
   applying a transformation to values of the first and the second physical quantities to be visualized, to transform the values of the first and the second physical quantities to be visualized from original coordinates into the first, the second and the third color coordinates;
   transforming the values of the first and the second physical quantities to be visualized from the first, the second and the third color coordinates into chromatic coordinates of a pre-selected visualization system;
   simultaneously comparing and visualizing an image/volume representing a combination of the first and the second physical quantities on the pre-selected visualization system.

2. The method according to claim 1, wherein the first and the second physical quantities are seismic quantities.

3. The method according to claim 2, wherein the seismic quantities include at least one selected from the group consisting of an acoustic impedance, an elastic impedance, a magnitude, an instantaneous frequency, a phase of seismic waves and a velocity of seismic waves.

4. The method according to claim 1, wherein the first physical quantity is at least one seismic quantity selected from the group consisting of an acoustic impedance, an elastic impedance, a magnitude, an instantaneous frequency, a phase of seismic waves and a velocity of seismic waves measured at a first time, and the second physical quantity is the same seismic quantity measured at a second time different from the first time.

5. The method according to claim 1, wherein the visualizing shows a change in the first physical quantity in comparison to the second physical quantity over a period of time.

* * * * *